United States Patent
Haselhorst et al.

(12)

(10) Patent No.: US 6,346,562 B1
(45) Date of Patent: Feb. 12, 2002

(54) CROSS-LINKABLE MIXTURES AND A METHOD FOR THE PRODUCTION AND UTILIZATION THEREOF

(75) Inventors: Rolf Haselhorst, Leverkusen; Ralf Karch, Kleinostheim; Klaus Zimmermann, Alzenau, all of (DE)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/582,123

(22) PCT Filed: Dec. 22, 1998

(86) PCT No.: PCT/EP98/08407

§ 371 Date: Oct. 23, 2000

§ 102(e) Date: Oct. 23, 2000

(87) PCT Pub. No.: WO99/32552

PCT Pub. Date: Jul. 1, 1999

(30) Foreign Application Priority Data

Dec. 22, 1997 (DE) .......................................... 197 57 221

(51) Int. Cl.$^7$ .................................................... C08J 3/00
(52) U.S. Cl. ........................ 524/106; 524/710; 524/111; 524/148; 524/135; 524/151; 528/15; 528/31
(58) Field of Search ................................ 524/710, 106, 524/111, 148, 135, 151; 528/15, 31

(56) References Cited

U.S. PATENT DOCUMENTS

| 5,380,812 A | 1/1995 | Lutz et al. ..................... 528/15 |
| 6,187,890 B1 * | 2/2001 | Fehn et al. ................... 528/15 |

FOREIGN PATENT DOCUMENTS

EP    0761759 A    3/1997

* cited by examiner

Primary Examiner—Margaret G. Moore

(57) ABSTRACT

The invention relates to cross-linkable mixtures and a method for the production and utilization thereof.

9 Claims, No Drawings

CROSS-LINKABLE MIXTURES AND A METHOD FOR THE PRODUCTION AND UTILIZATION THEREOF

The present invention relates to crosslinkable mixtures, a process for preparing them and their use.

When using addition-crosslinking silicone rubber systems, a generally encountered problem is that once the reactive mixture has been prepared it has a finite curing rate even at room temperature. This is a particularly noticeable problem when the machines are not running for a relatively long time as a result of technical malfunctions or other causes. In such a case, the reactive silicone rubber mixture present in the machines can crosslink even at room temperature, which results in very costly cleaning work before the machines are restarted.

For this reason, there has for a long time been a market demand for addition-crosslinking silicone rubber systems which, ideally, do not cure at all at room temperature and have a very high reaction rate under processing conditions.

To achieve this aim, inhibitors are customarily added to the rubber systems. One group of inhibitors comprises organophosphorus compounds. Thus, for example, DE-A-3 635 236 describes the use of cyclometallated platinum-phosphite complexes for increasing the shelf life at room temperature. The catalyst inhibitor complexes described there increase the pot life at room temperature, but have the disadvantage that they are complicated to prepare, which is associated with additional costs in production. EP-A-662 490 describes organophosphorus compounds as inhibitors in addition-crosslinking silicone systems. However, the aliphatic and aromatic phosphines described there have the disadvantage that they cause a significant slowing of the reaction rate under processing conditions (T=120 to 170° C.). DE-P 19532316.5 describes addition-crosslinkable mixtures which contain an organophosphorus compound and an inhibitor in addition to a hydrosilylation catalyst. However, the use of a two-component system as described there is complicated. Mixtures which have complete inhibition at room temperature and no influence on the reaction rate under curing conditions with an additive are not previously known.

It is therefore an object of the invention to provide suitable mixtures which, even in fast, addition-crosslinking silicone systems, reduce the activity of the catalyst at room temperature without prolonging the curing times under reaction conditions.

In addition, the mixture should have a make-up which is as simple as possible, i.e. be composed of as few components as possible.

It has now been found that the problems in addition-crosslinking polysiloxane mixtures can be solved by these mixtures containing Pt compounds or elemental Pt or another substance which catalyses hydrosilylation and at least one phosphorus compound of the type specified in more detail below which bears a bulky substituent.

The invention accordingly provides crosslinkable mixtures comprising as components
a) at least one polysiloxane which has at least two olefinically or acetylenically unsaturated multiple bonds,
b) at least one polyhydrogensiloxane which has at least two hydrogen atoms bound directly to the silicon,
c) at least one substance which catalyses the hydrosilylation,
d) at least one compound of the formula (I)

$$R^1_n P(OR)_{3-n} \quad (I)$$

where n=an integer in the range 0–3,
R and $R^1$ are, independently of one another, compounds selected from the following group

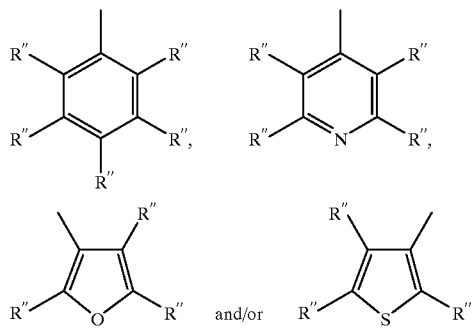

where
R″=
—H,
—CR‴$_3$,
—SiR‴$_3$,
—Hal,
—OR‴ and/or
$(CR^4_2)_m$—P(OR$^1$)$_l$R$_{2-l}$ where
l=0–2
m=1 to 10 and
$R^4$=H, —CR‴$_3$,
—SiR‴$_3$, —Hal, —OR‴ and/or SiR‴$_3$,
where at least one radical R″ has to be different from H and when n=0, at least one of the radicals R″ is SiR‴$_3$, and
R‴=saturated or unsaturated $C_1$–$C_{30}$-alkyl, aryl, $C_7$–$C_{31}$-arylalkyl and/or $C_7$–$C_{31}$-alkylaryl radicals which may bear functional groups such as carboxylic acid derivatives or the reaction product of the components c) and d) and
e) if desired, further auxiliaries.

Component a) for the purposes of the invention is preferably a cyclic, linear or branched polysiloxane built up of units of the general formula (II)

$$(R^3)_a(R^4)_b SiO_{(4-a-b)/2} \quad (II).$$

In this formula, $R^3$ is a $C_2$–$C_8$-alkenyl radical, e.g. vinyl, allyl, 1-butenyl, 1-hexenyl, etc. The alkenyl radicals can be bound to silicon atoms within the chain or at the end of the chain. $R^4$ is a monovalent, saturated hydrocarbon radical having up to 10 carbon atoms selected from the group consisting of substituted and unsubstituted alkyl, aryl and arylalkyl radicals. Examples of monovalent radicals $R^4$ are methyl, ethyl, propyl, isopropyl, butyl, octyl etc., cyclobutyl, cyclopentyl, cyclohexyl etc., phenyl, tolyl, xylyl, naphthyl, etc., benzyl, phenylethyl, phenylpropyl. The integers a and b are as follows: $0 \leq a \leq 3$ and $0 \leq b \leq 3$ and $0 \leq a+b \leq 4$. Preferably, a is 0 or 1. In the radicals $R^4$ of the present invention, some or all hydrogen atoms can be replaced by fluorine and/or chlorine, bromine or iodine atoms or cyano groups. This means that $R^4$ can also be, for example, a chloromethyl, trifluoropropyl, chlorophenyl, dibromophenyl, cyanoethyl or cyanopropyl radical.

The molecular weight of the polysiloxane is preferably 100–600,000.

Using the nomenclature with which those skilled in the art are familiar
M (CH$_3$)$_3$SiO$_{1/2}$ D $(CH_3)_2SiO_{2/2}$
T $(CH_3)SiO_{3/2}$
$M^{Vi}$ $(CH_2=CH)(CH_3)_2SiO_{1/2}$
$=D^{Vi}$ $(CH_2=CH)(CH_3)SiO_{2/2}$,
the following examples of the component a) may be given:
$M_2D_{100}{}^{Vi}_3$
$M_2{}^{Vi}D_{160}$
$M^{Vi}{}^{MD}{}_{100}D_3{}^{Vi}$
$T_5D_{550}M_7{}^{Vi}$
$T_3D_{500}M_2{}^{Vi}M_2$
$T_6D_{300}D^{Vi}M_4{}^{Vi}M_4$
$M_2{}^{Vi}D_{1000}$
$M_2{}^{Vi}D_{1000}D_{50}{}^{Vi}$ and
$M_2D_{2000}D_5{}^{Vi}$.

The mole fraction of unsaturated radicals of the $R^3$ type can be chosen at will.

In the component a), the mole fraction of unsaturated radicals of the $R^3$ type is preferably between $10^{-3}$ and 10 mmol per gram. The expression "between" always includes, both here and in the following, the lower and upper values indicated.

For the purposes of the present invention, the component b) is a polysiloxane which is built up of units of the general formula (III)

$$H_c(R^4)_dSiO_{(4-c-d)/2} \qquad (III)$$

where $R^4$ has been defined above and $R^4$ may also be as defined for $R^3$. The stoichiometric indices c and d are integers as follows: $0 \leq d \leq 3$ and $0 \leq c \leq 2$ and $0 \leq c+d \leq 4$. Preferably, $0 \leq c \leq 1$.

The molecular weight of the component b) is preferably 100–12,000.

Using the nomenclature with which those skilled in the art are familiar
Q $SiO_{4/2}$
$M^H$ $H(CH_3)_2SiO_{1/2}$
$D^H$ $H(CH_3)SiO_{2/2}$,
the following examples of the component b) may be given:
$M_2{}^HD_{10}$,
$M_2D_{10}D_{10}{}^H$,
$M_2{}^HD_{20}D_{10}{}^H$,
$M_2{}^{Vi}D_{11}{}^H$,
$M_2D_3{}^{Vi}D_6{}^H$, and
$QM_{1.3-16}{}^HD_{0.1}$,
(M, D, $M^{Vi}$ and $D^{Vi}$ as defined for component a)).

The mole fraction of hydrogen atoms bound directly to a silicon atom in the component b) can be selected at will.

In the component b), the mole fraction of hydrogen atoms bound directly to a silicon atom is preferably between 0.01 and 17 mmol, particularly preferably between 0.1 and 17 mmol and very particularly preferably between 1 and 17 mmol, per gram of component b).

In the total mixture described, the components a) and b) should preferably be present in such a mixing ratio that the molar ratio of hydrogen atoms bound directly to a silicon atom (SiH) in the component b) to the unsaturated radicals (Si-vinyl) in the component a) is between 0.05 and 20, particularly preferably between 0.5 and 10 and very particularly preferably between 1 and 5.

For the purposes of the invention, component c) preferably comprises the elements platinum, rhodium, indium, nickel, ruthenium and/or palladium in elemental form on a support material or in the form of their compounds. Preference is given to platinum compounds or platinum complexes, for example $H_2PtCl_6$, platinum-olefin complexes, platinum-alkoxide complexes, platinum-vinylsiloxane complexes, or else elemental platinum on a support material such as activated carbon, $Al_2O_3$ or $SiO_2$. Component c) is particularly preferably a platinum-vinylsiloxane complex. Platinum-vinylsiloxane complexes preferably have at least 2 olefinically unsaturated double bonds in the siloxane, see, for example, U.S. Pat. No. 3,715,334.

The term siloxane also includes polysiloxanes, i.e., for example, vinylpolysiloxanes. The proportion of component c) in the total mixture should preferably be set so that the noble metal content is between 1 and 1000 ppm, particularly preferably between 1 and 500 ppm and very particularly preferably between 1 and 100 ppm.

For the purposes of the invention, component d) is preferably an organophosphorus compound of the type $$R^1{}_nP(OR)_{3-n},$$

where
  n=0–3 and
  R and $R^1$ are, independently of one another,

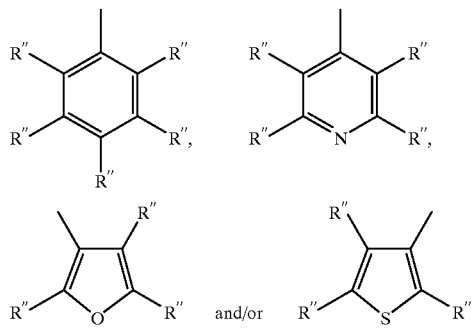

where
  R''=
    —H,
    —CR'''$_3$,
    —SiR'''$_3$,
    —Hal,
    —OR''' and/or —(CR$^4{}_2$)$_m$—P(OR$^1$)$_1$R$_{2-l}$,
      where
        at least one radical R'' has to be different from H and/or at least one of the radicals R or $R^1$=—(CR$^4{}_2$)$_m$—P(OR$^1$)$_1$R$_{2-l}$, where l=0–2, m=1–10 and $R^4$=H, —CR'''$_3$, —SiR'''$_3$, Hal, OR''' and/or SiR'''$_3$ and
        R'''=saturated or unsaturated $C_1$–$C_{30}$-alkyl, aryl, $C_7$–$C_{31}$-arylalkyl and/or $C_7$–$C_{31}$-alkylaryl radicals which may bear functional groups such as carboxylic acid derivatives.

Bulky radicals for the purposes of the invention also include substituted or unsubstituted polyaromatics or heteroaromatics or heteropolyaromatics, e.g. polythiophene, furan, thiophene, pyridine, pyrrole or naphthalene, etc.

In a preferred embodiment of the invention, the components c) and d) have already reacted with one another, so that a reaction product, i.e. an organic metal complex, is present in the crosslinkable mixture.

These reaction products are formed spontaneously by bringing the starting materials into contact with one another at temperatures between 40 and 200° C., if desired in a solvent such as toluene, dichloromethane or heptane.

The component d) according to the present invention is preferably added in a proportion of from 1 ppm to 50,000 ppm, based on the total weight of the mixture, particularly preferably from 10 ppm to 10,000 ppm and very particularly preferably between 20 ppm and 2000 ppm, if separate addition of the component d) is desired.

The components d) can be prepared, for example, by the methods described in Methoden der organ. Chemie, Houben-Weyl, Volume XII/2, 1964, 4th edition, pp. 59–61.

Auxiliaries (component e)) for the purposes of the invention are, for example, polysiloxane resins which are built up of building blocks of the general formulae (II) and (III), fillers which have a positive influence on the mechanical and electrical properties of the cured mixture of the invention, e.g. pyrogenic and precipitated silicas having a BET surface area of from 50 to 500 m²/g. Such fillers can be surface-modified, e.g. with organosilicon compounds. The modification can also be achieved during incorporation into the polymer by addition of, for example, α,ω-OH-terminated oligosiloxanes or polysiloxanes or hexamethyldisilazane or 1,3-divinyl-1,1,3,3-tetramethyldisilazane with addition of water.

Further fillers which can be used are, for example, diatomaceous earths, finely divided quartz flours, amorphous silicas or carbon blacks as well as Al(OH)$_3$, ceramicizable oxides, etc.

In a further embodiment, the mixtures of the invention additionally contain water or an organic solvent.

In a preferred embodiment of the invention, the components a) and b) are present in such a mixing ratio that the ratio SiH:Si-vinyl is between 0.1 and 10, the content of component c) is between 1 and 1000 ppm, based on the noble metal, and the content of component d) is between 0.0001 and 5%, where the figures are in each case based on the total weight of the mixture.

The present invention also provides a process for preparing the crosslinkable mixtures of the invention. In this, it is preferred that the components a) and d) are mixed and the component b) and finally the component c) are then added.

In a further embodiment of the invention, the components c) and d) are separately mixed, if desired in an organic solvent, and subsequently added to the components a) and b).

The invention further provides for the use of the crosslinkable mixture of the invention for preparing addition-crosslinking silicone rubbers.

In addition, the invention provides silicone rubbers obtainable by vulcanization of at least one crosslinkable mixture at a temperature between 40° C. and 250° C.

What is claimed is:

1. A hydrosilylation crosslinkable mixture comprising:
   a) at least one polysiloxane which has at least two olefinically or acetylenically unsaturated multiple bonds,
   b) at least one polyhydrogensiloxane which has at least two hydrogen atoms bound directly to a silicon atom,
   c) at least one substance which catalyzes hydrosilylation,
   d) at least one compound of the formula:

$$R^1{}_n P(OR)_{3-n} \quad (I)$$

where
   the subscript n is an integer ranging from 0 to 3,
   R and R$^1$ are independently selected from the group consisting of

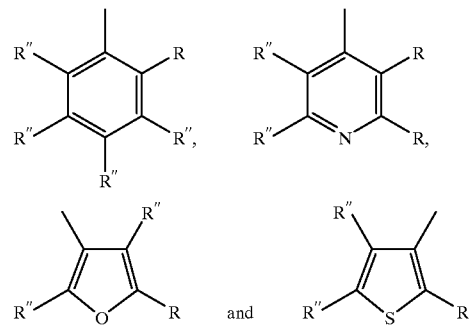

where R" is selected from the group consisting of:
H, CR'''$_3$, SiR'''$_3$, Halogen, OR''' and (CR$^4{}_2$)$_m$P(OR$^1$)$_l$R$_{2-l}$ where the subscript l is an integer ranging from 0 to 2, the subscript m is an integer ranging from 1 to 10, where R$^4$ is selected from the group consisting of H, CR'''$_3$, SiR'''$_3$, Halogen, and OR''' where at least one radical R" must be different from H and when n=0, at least one of the radicals R" is SiR'''$_3$, and R''' is selected from the group consisting of:
   i) saturated or unsaturated C$_1$–C$_{30}$ alkyl radicals,
   ii) saturated or unsaturated C$_1$–C$_{30}$ alkyl radicals,
   iii) saturated or unsaturated C$_7$–C$_{31}$ arylalkyl radicals and
   iv) saturated or unsaturated C$_7$–C$_{31}$ arylalkyl radicals bearing carboxylic acid derivative functional groups;

where components c) and d) may be present as the reaction products thereof.

2. The crosslinkable mixture of claim 1, characterized in that component c) is a Pt compound, a platinum complex or elemental platinum on a support material.

3. The crosslinkable mixture of claim 2 characterized in that component c) is a platinum-vinylsiloxane complex in which the siloxane has at least two olefinically unsaturated double bonds.

4. The crosslinkable mixture of claim 1 further comprising water.

5. The crosslinkable mixture of claim 1 further comprising an organic solvent.

6. The crosslinkable mixture of claim 1 characterized in that the components a) and b) are present in a mixing ratio wherein the ratio SiH:Si-vinyl is between 0.01 and 300, the content of component c) is between 0.1 and 1,000 ppm, based on the noble metal content, and the content of component d) is between 0.0001% and 5%, based on the total weight of the mixture.

7. A process for preparing a crosslinkable mixture according to claim 1 wherein components a) and d) are mixed, component b) is then added and component c) is added finally.

8. An addition-crosslinking silicone rubber comprising the mixture of claim 1.

9. The silicone rubber obtained by vulcanization the mixture of claim 1 at a temperature between 40° C. and 250° C.

* * * * *